United States Patent

Sanchez

[11] Patent Number: 5,873,930
[45] Date of Patent: Feb. 23, 1999

[54] WATER-AIR BAFFLE FILTER

[76] Inventor: Angelo Sanchez, P.O. Box 964, New City, N.Y. 10956

[21] Appl. No.: 921,119
[22] Filed: Aug. 29, 1997
[51] Int. Cl.⁶ .................................................. B01D 47/02
[52] U.S. Cl. ........................ 96/278; 96/279; 96/329; 96/333; 96/362; 55/445; 55/DIG. 3
[58] Field of Search ........................... 55/244, 245, 253, 55/255, 257.6, 444, 445, DIG. 3; 96/278, 279, 329, 333, 362

[56] References Cited

U.S. PATENT DOCUMENTS

| | | | |
|---|---|---|---|
| 2,795,103 | 6/1957 | Jenison | 55/445 |
| 3,264,804 | 8/1966 | Sendelbach | 55/253 |
| 3,473,299 | 10/1969 | Powers | 55/253 |
| 3,807,144 | 4/1974 | Graybill | 55/445 |
| 4,036,612 | 7/1977 | Guttmann | 55/445 |
| 4,547,206 | 10/1985 | Sovis et al. . | |
| 4,640,697 | 2/1987 | Erickson, Jr. . | |
| 4,824,333 | 4/1989 | Erickson, Jr. . | |
| 4,874,404 | 10/1989 | Boswell . | |
| 5,076,819 | 12/1991 | Sharrow . | |
| 5,078,759 | 1/1992 | Kira | 55/255 |
| 5,205,014 | 4/1993 | Yoo . | |
| 5,210,902 | 5/1993 | Lee et al. . | |
| 5,215,560 | 6/1993 | Lee | 55/253 |
| 5,237,719 | 8/1993 | Dwyer, Jr. et al. . | |
| 5,354,347 | 10/1994 | McCoy et al. . | |
| 5,428,865 | 7/1995 | Yarbrough . | |

FOREIGN PATENT DOCUMENTS

| | | | |
|---|---|---|---|
| 629716 | 10/1961 | Canada | 55/253 |
| 946608 | 7/1982 | U.S.S.R. | 55/445 |
| 234516 | 2/1926 | United Kingdom | 55/445 |
| 372426 | 5/1932 | United Kingdom | 55/253 |
| 637480 | 5/1950 | United Kingdom | 55/255 |

Primary Examiner—Jay H. Woo
Assistant Examiner—Minh-Chau T. Pham
Attorney, Agent, or Firm—Graham & James LLP

[57] ABSTRACT

A filtration device particularly for use with vacuum cleaners used for collection of fine particles which tend to clog porous solid filters. The device utilizes readily replaceable water as a filtration medium with air being forced into the water then released for additional multiple water contacts. The device further includes horizontal baffles with air access apertures therein which are positioned above the surface of the water, with a vacuum being applied to the area. This redirects particle laden air into filtration contact with water multiple times wherein filtration efficiency is in excess of 99%.

8 Claims, 5 Drawing Sheets

1

WATER-AIR BAFFLE FILTER

FIELD OF THE INVENTION

This invention relates to filtration of particles drawn by a vacuum and particularly to filtration of particles by means of a water filter.

BACKGROUND OF THE INVENTION

The vacuum removal of particles, particularly of fine size, commonly entails materials such as gypsum, encountered with sanding of wallboard; sawdust; house dust and the like. Continued efficacious removal of the fine particles further requires the utilization of replaceable filtration elements usually made of cloth, foam, paper and the like which trap the particles. However such filtration elements must be periodically replaced since clogging reduces vacuum removal efficiency and this is at an economic cost and with lost time involved in the replacement. In addition, such replacements are at periodic short time intervals, especially with heavy duty and continuous applications.

In response to the demands placed on solid porous filters, fluid filtration has been utilized wherein the particle laden air is vacuum drawn into contact with a fluid (invariably water) surface with particles being removed by such water surface as a filtration of the air. Efficiency of such removal is however less than ideal since the air is not actually drawn through the water in a manner similar to the solid filters, but is instead caused to contact the surface of the water, and at most only bubbled through a short depth beneath the exposed surface.

SUMMARY OF THE INVENTION

It is therefore an object of the present invention to provide a means for increasing the filtration efficiency of a water filter.

It is a further object of the present invention to effect such increased efficiency by providing the water filter with an apertured baffle system which directs and redirects particle laden air into multiple contacts with the filtering water surface.

These and other objects, features and advantages of the present invention will become more evident from the following discussion and drawings in which:

SHORT DESCRIPTION OF THE DRAWINGS

DETAILED DESCRIPTION OF THE INVENTION

Figure 1:
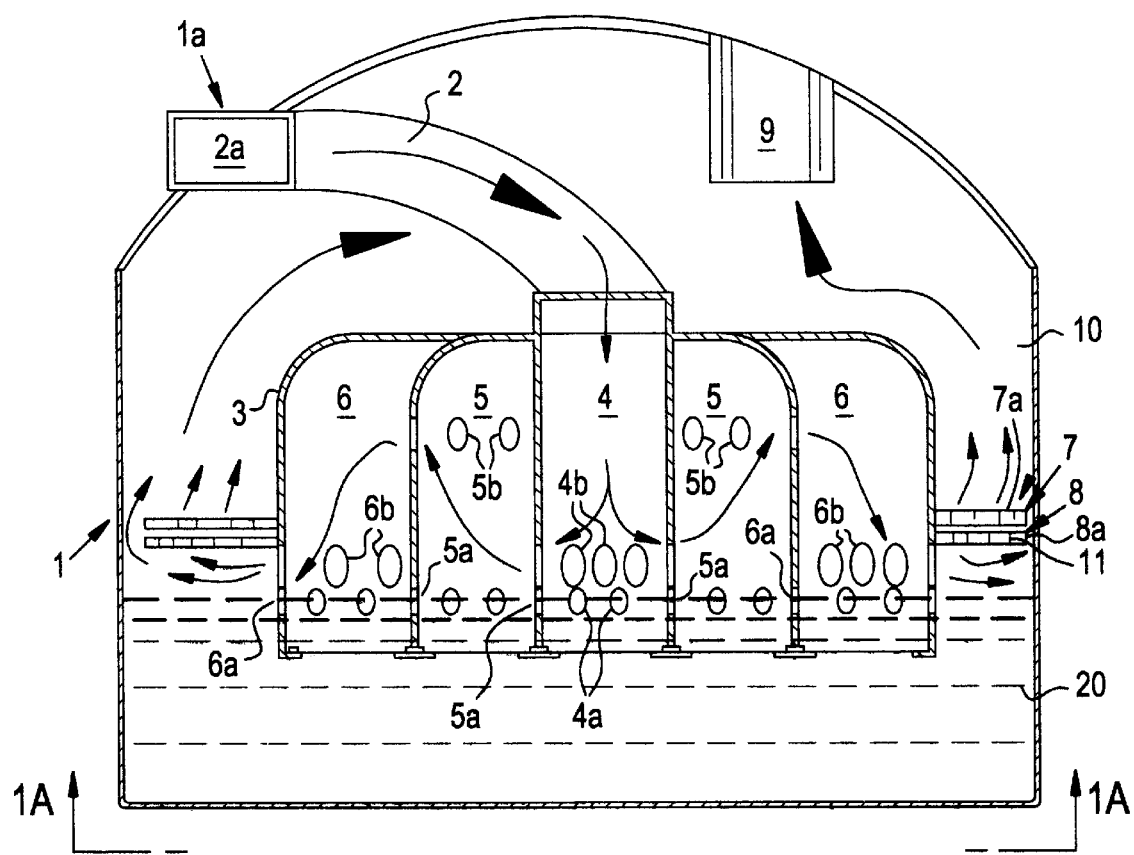
FIG. 1 is a schematic cross section side view of the water filtering device of the present invention.

The device of the present invention is particularly suitable as an add-on adjunct for use with shop vac, and industrial vac devices which are used in continuous and heavy duty vacuum applications such as with plaster sanding, woodworking and heavy duty industrial applications. The device is permanent, except for the filtering water which requires infrequent changing and then only when the water is completely saturated. Since the water is not in the vacuum line path, its containment of particles does not affect vacuum operation except to the extent that it cannot contain additional particles with saturation. The device is operable by mixing water into the incoming stream of dust or particle laden air vacuumed into the receptacle of any vacuuming device. The mist or droplets of air bind the dust or wood particles thereby cleaning or filtering the air with efficiencies of removal as high as 99%. There are no moving be, parts or items subject to wear.

In a vacuuming device, such as a typical shop vac or industrial vac, a rotary motor therein creates a vacuum in a canister of vacuuming device which thereby pulls dust or sanding particles through an inlet port. In accordance with the present invention, the typical shop vac or industrial vac is modified such that the drawn air with dust or sanding particles which is carried through an inlet port in the vacuum cleaning device and then by pipe or hose passageway into the body of the device is further carried into a conduit having an open end extending into a water filter comprised of one or more apertured canisters containing water.

If there are multiple canisters they are positioned concentrically relative to each other for maximum efficiency.

In a first embodiment, the air is fed by the hose passageway into a centrally positioned canister, having side apertures, leading to an adjacent canister. These side apertures are positioned at and adjacent to the water surface whereby the dust laden air is immediately brought into contact with increased surface area roiled water. After contact with the water (with substantial dust removal from the air), the air escapes to an adjacent second enclosed canister having an interior exposed to a water surface and with apertures above and at the water surface. The vacuum of the vacuum cleaning device pulls the air through these apertures, thereby further causing it to contact the water or water surface for a contact residue-removal of additional dust particles by means of the churning action occurring as the air hits the water surface. This action is further repeated, preferably for an additional time with another enclosed canister. Additional canisters may be used, as desired or to which extent the vacuum strength is capable of drawing the air. The water filtered air is then drawn into the vacuum canister of the device and expelled through an exit or exhaust port. The bottoms of all the filtering canisters are open so that water flows thereinto to the proper levels as determined by the apertures in the walls of the respective canisters.

Increase of turbulence or agitation of the air in contact with a water surface results in increased removal by the water of the dust contained in the air. Accordingly, in operation, the filtering device of the present invention comprises at least two and preferably at least three chambers for filtering dust by causing a contact between the dust laden air and a water surface, with misting and mixing of the air with water droplets together with the physical action involved in the air and water being drawn through small openings. By arranging the apertures between the canisters to be staggered in an up-down position there is additional turbulence created by the movement of the dust-laden air as it contacts the water surface.

In a further preferred modification, perforated baffles (preferably two coextensive baffles) are positioned in the outer water container between the exit from the outermost canister, relative to the inlet conduit, and the air outlet port. The baffles are positioned above a water surface to provide, with the baffle placed closest to the outermost canister apertures, a final directing of the air to the water surface for removal of any residual dust, before the air is externally expelled. In order to permit proper air exhaust rates without a build-up of excessive internal pressure, the baffles do not extend to completely close the outlet to the outlet port and the perforations therein are preferably about ⅛" (3 mm) and spaced along the surface of the baffles. Perforations between the baffles are however arranged to be out of line with one another to thereby cause air to meander and be further filtered by contact with surfaces along its exit path. Alternatively, the baffles can be directly contained within the outermost canister and positioned between the outlet apertures of the canister and the surface of the water, for effecting continued redirecting of the air onto the water surface, until the air exits through the baffles and outlet apertures to the exhaust port.

In a second embodiment of the present invention, dust laden air is initially drawn directly into the filtering water and allowed to escape from the conduit below the surface of the water through the conduit end and side apertures, which are positioned below the surface of the water. The conduit extends through baffle members which form an enclosed area between the water surface and the exhaust port with the baffles providing a redirecting of the air to the water surface for continued filtering by contact therewith until it is able to exit the apertures in the baffles to the exhaust port.

DETAILED DESCRIPTION OF THE PREFERRED EMBODIMENTS AND THE DRAWINGS

With respect to the drawings, in FIG. 1, the intake portion 1a of shop vac 1 is shown with intake 2a leading into intake conduit 2. Intake conduit 2 directs the dust laden air into central canister 4 which is open at its lower end into a water reservoir 20 contained within vacuum canister 10. Concentric canisters 5 and 6 are similarly open at their lower ends into the reservoir 20 whereby the water reaches a common level. Canisters 4, 5 and 6 each have two sets of apertures in the side walls thereof 4a, 5a and 6a, respectively, which are positioned at the surface of the water. In addition, each of the canisters has a second set of apertures 4b, 5b and 6b respectively which are positioned in the side walls of the canisters but above the water surface and staggered (above or below) the apertures of the adjacent canisters. Thus, as shown apertures 4b and 6b are low and apertures 5b are high in the walls of the respective canister. As previously described, the staggered aperture arrangement increases water roiling and filtering effect. Stacked apertured baffle elements 7 and 8 extend from the outer walls of outermost canister 6 but do not extend to the wall of the vacuum canister thereby providing a non-restricted partial air passageway 11. Baffle elements 7 and 8 are positioned above apertures 6a and 6b whereby air exiting apertures 6a and 6b is immediately redirected thereby into additional contact with the water surface before the air is exhausted to exhaust port 9 through apertures 7a and 8a respectively in baffles 7 and 8 and through air passageway 11. As shown in FIG. 1, apertures 7a and 8a are not aligned to cause air to meander therebetween with surface contact with each of the baffles (for final residual dust removal) prior to exhaust exiting of the air.

Figure 1A:
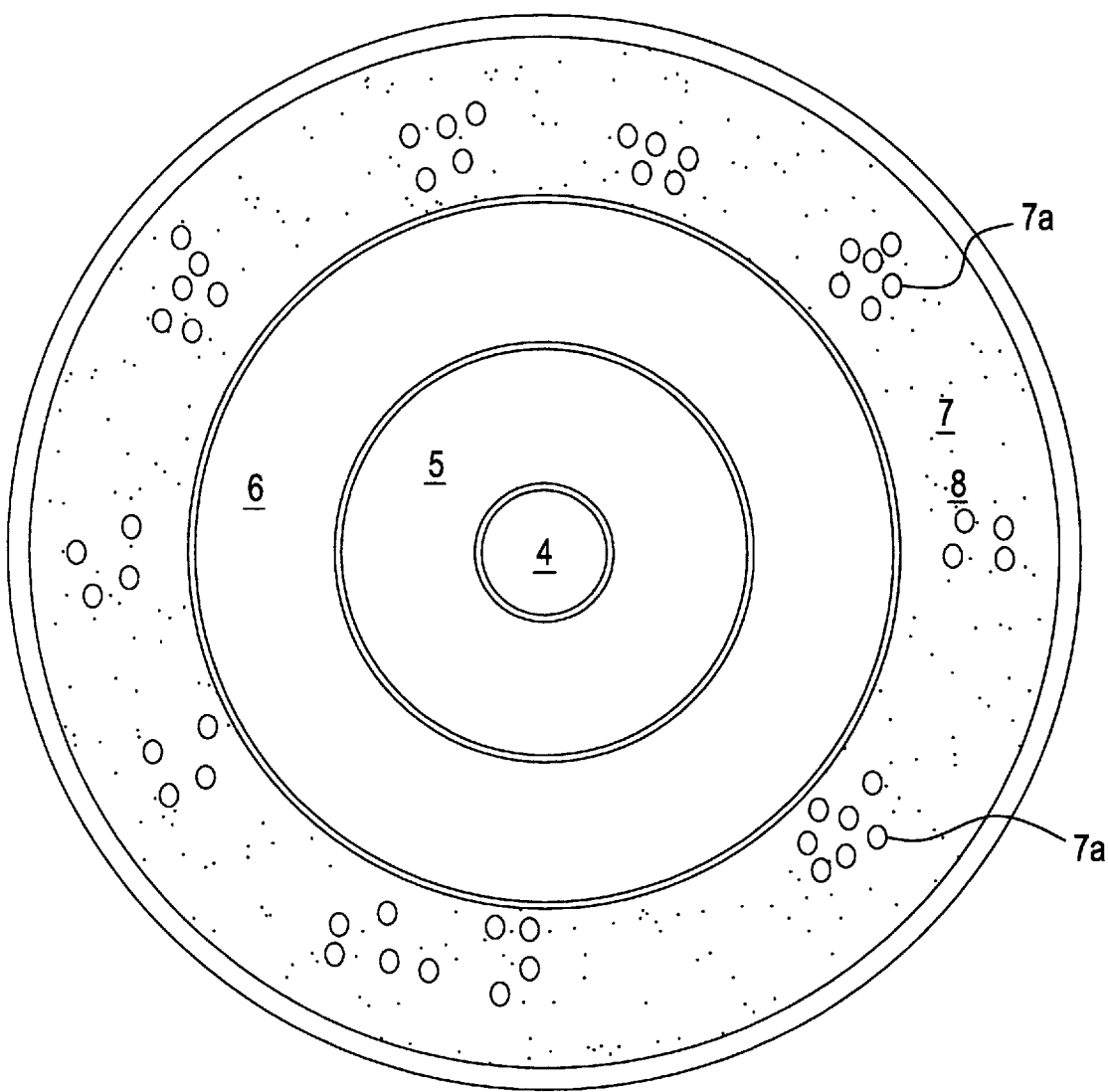
FIG. 1a is a bottom view taken along line A—A of the device as schematically shown in FIG. 1.

As more clearly seen in FIG. 1a, canisters 4, 5 and 6 are concentric to each other and baffles 7 and 8 are configured as cantilevered ring flanges for maximum initial contact with air exiting from canister 6.

Figure 2:
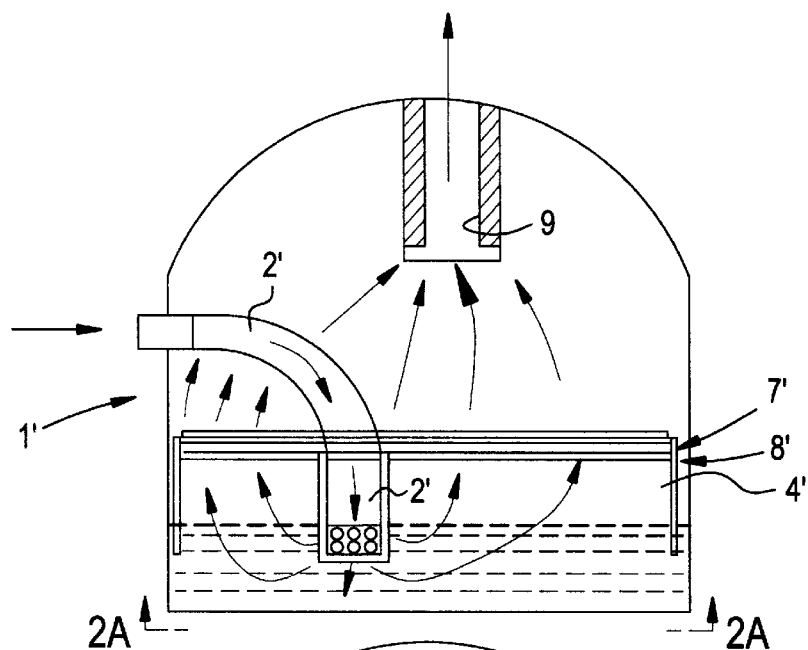
FIG. 2 is a schematic cross section side view of a second embodiment of the device of the present invention.
Figure 2B:
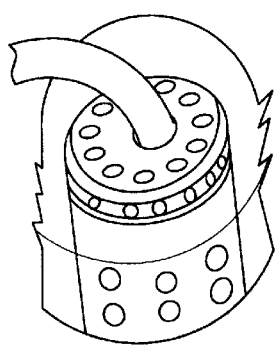
FIG. 2b is a schematic isometric view of the filtration device of FIG. 2.
Figure 2A:
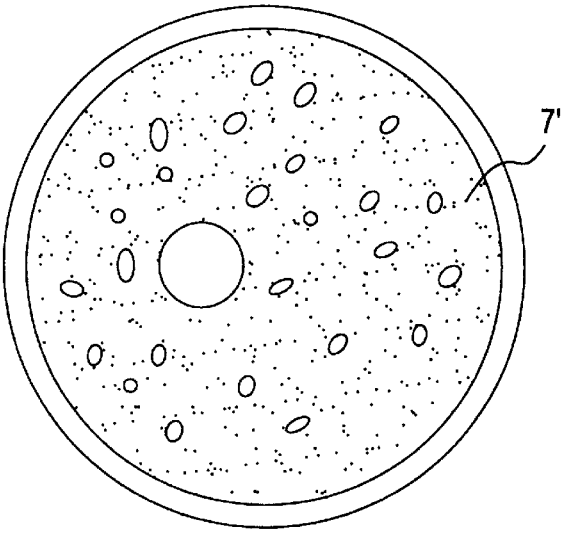
FIG. 2a is a bottom view taken along line B—B of the embodiment shown in FIG. 2.

In FIGS. 2, 2a and 2b a second embodiment 1' of the water filter of the present invention is shown with direct positioning of conduit 2' into water contained within single canister 4' to a depth of about ½" (13 mm). In this embodiment conduit 2' is apertured below the water surface whereby the air is bubbled through the water for filtration thereof. When the air exits the water, as shown by the arrows, it is re-directed to the water surface for additional filtration, until the air by-passes apertured baffles 7' and 8' to be exhausted through exhaust port 9.

Figure 3:
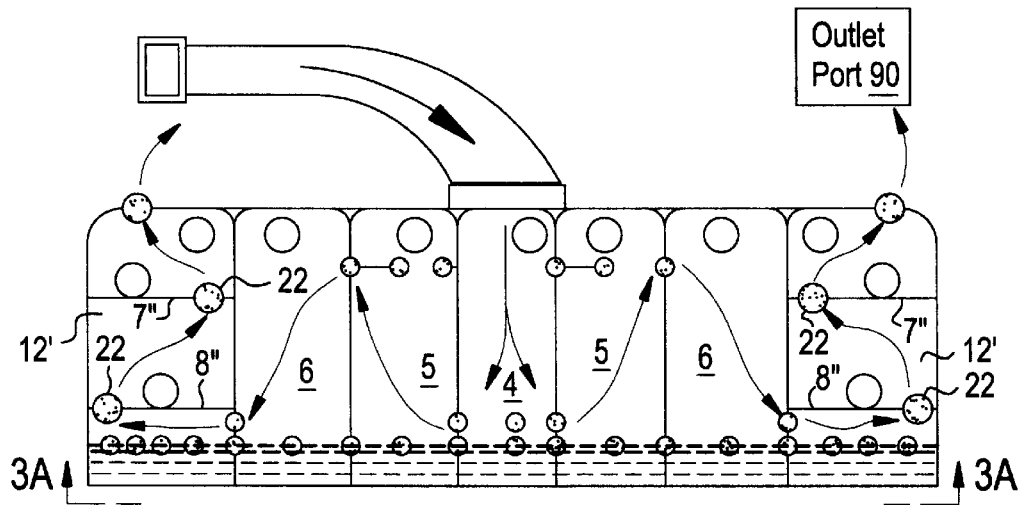
FIG. 3 is a schematic cross section side view of a third embodiment of the device of the present invention.
Figure 3A:
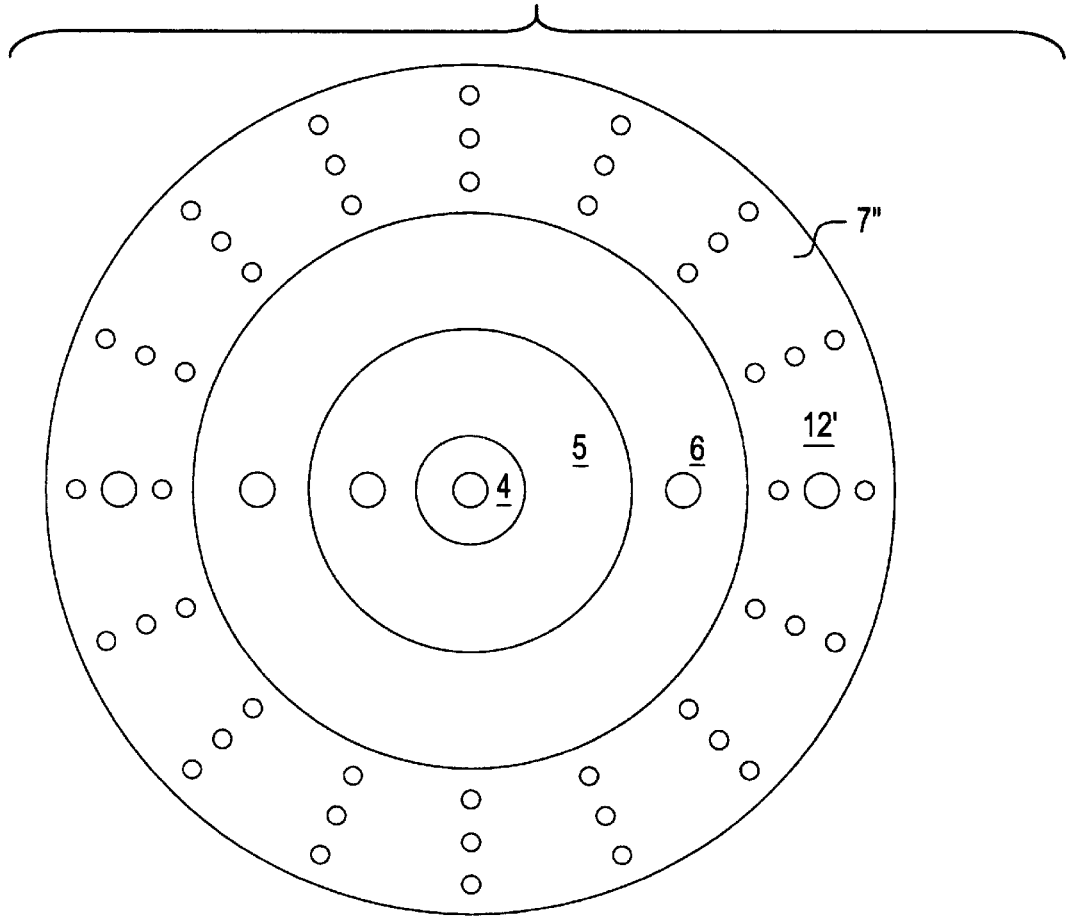
FIG. 3a is a bottom view taken along line C—C of the embodiment shown in FIG. 3.

The embodiment shown in FIGS. 3 and 3a is similar to that shown in FIGS. 1 and 1a but with an additional outermost canister 12' in which baffles 7" and 8" are internally positioned with non-aligned apertures 22 leading to outlet port 90.

Figure 4:
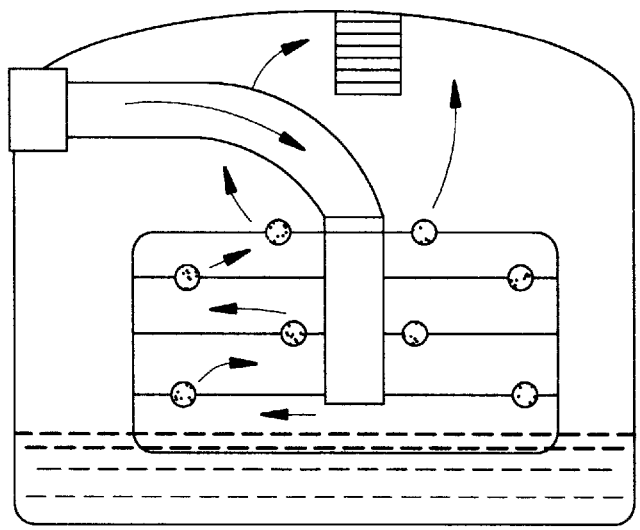
FIG. 4 is a schematic cross section view of a modified embodiment of the embodiment shown in FIG. 3, wherein dust laden air is introduced above the surface of the water and wherein the baffles are spaced further apart.

In FIG. 4, the embodiment of FIG. 3 is shown with the inlet port is positioned above rather than into the water.

It is understood that the above description and specific embodiments are only illustrative of the present invention and that changes in structure, type and arrangement of the water filtering elements and the like may be made without departing from the scope of the present invention as defined in the following claims.

What is claimed is:

1. A device for filtering dust laden air which is adapted to be used with a vacuum cleaning device, said filtering device comprising a water reservoir and at least one canister, having an open end, positioned within the water reservoir and wherein the canister contains water therein with a water surface thereof, with said device comprising means for connecting the filtering device between an air intake and outlet of the vacuum cleaning device, wherein said filtering device comprises means for directing dust laden air, entering the air intake, from above the water surface and into contact with the surface of water of the water reservoir for a successive multiple number of times, for continued removal of dust from the air by the contacted water surface and wherein said device comprises means for roiling the contacted water during said contact.

2. The device of claim 1, wherein said filtering device comprises at least two successively adjacent chambers with apertured connection between adjacent chambers, which chambers are positioned in said water reservoir to have a common water level and wherein the apertured connection between the successively adjacent chambers is positioned at the common water level, wherein the air intake is connected to a first chamber to direct dust laden air thereto and wherein the air outlet is connected a last chamber of the at least two successively adjacent chambers.

3. The device of claim 2, wherein the means for roiling the contacting water comprises additional apertured connections between successively adjacent chamber, which are successively positioned at different height levels relative to the water level whereby entering air causes said roiling.

4. The device of claim 2, wherein the device comprises at least two apertured spaced apart baffle members positioned parallel to each other and with a first of the baffle members being positioned such that air from the last chamber is directed by the first baffle member into contact with the water of the reservoir and then through the apertured baffle members to the air outlet of the vacuum cleaning device.

5. The device of claim 4, wherein the baffle members comprise apertures are not in alignment with apertures of a baffle member adjacent thereto.

6. The device of claim 5, wherein the baffle members are positioned in the last chamber.

7. The device of claim 6, wherein the baffle members are positioned outside of the last chamber in a position between an outlet of the last chamber and the outlet of the vacuum cleaning device.

8. A device for filtering dust laden air which is adapted to be used with a vacuum cleaning device, said filtering device comprising a water reservoir and a chamber member having an open end, positioned within the water reservoir which water reservoir contains water therein, with said device comprising means for the connection thereof between an air intake and outlet of the vacuum cleaning device, wherein said filtering device comprises means for directing dust laden air, entering the air intake, from above the water surface, at the surface of the water in the water reservoir, said filtering device further comprising at least two apertured spaced apart baffle members positioned parallel to each other and with a first of the baffle members being positioned such that air escaping from the water surface is directed by the first baffle member into contact with the water surface of the reservoir and then through the apertured baffle members to the air outlet of the vacuum cleaning device.

* * * * *